United States Patent [19]
Llewellyn

[11] 3,777,131

[45] Dec. 4, 1973

[54] HIGH BASE MULTIPLE RAIL FOURIER TRANSFORM SERIAL STAGE

[75] Inventor: Richard E. Llewellyn, Greenbelt, Md.

[73] Assignee: Westinghouse Electric Corporation, Pittsburgh, Pa.

[22] Filed: Feb. 8, 1972

[21] Appl. No.: 224,501

[52] U.S. Cl. .................................................. 235/156
[51] Int. Cl. ........................... G06f 7/38, G06f 15/34
[58] Field of Search ...................................... 235/156

[56] References Cited

UNITED STATES PATENTS

| | | | |
|---|---|---|---|
| 3,588,460 | 6/1971 | Smith | 235/156 |
| 3,686,490 | 8/1972 | Goldstone | 235/156 |

OTHER PUBLICATIONS

G. D. Bergland, "Fast Fourier Transform Hardware Implementations – An Overview," IEEE Trans. Vol. AU–17 No. 2 June 1969, pp. 104–108.

*Primary Examiner*—Felix D. Gruber
*Assistant Examiner*—David H. Malzahn
*Attorney*—F. H. Henson et al.

[57] ABSTRACT

A serial processor section for use in a parallel-serial processor of a multiple-input Fast Fourier Transform (FFT) machine wherein a base higher than 2 is used for the expansion of the Cooley-Tukey algorithm. The serial processor section utilizes a plurality of serial processor stages, each having a number of rails equal to the number of the base used to expand the Fourier series equations, with each rail being an input and an output line to and from the stage. The multiple rails originate at the output of the parallel processor section and pass from serial stage to serial stage in the parallel-serial processor to derive the desired outputs therefrom. Appropriate delay means, multiplier means and summing circuits are utilized in the serial processor section in order to generate outputs therefrom in accordance with the Cooley-Tukey algorithm.

19 Claims, 13 Drawing Figures

PARALLEL-SERIAL 4-RAIL PROCESSOR

PARALLEL-SERIAL 8-RAIL PROCESSOR USING DUAL 4-RAIL SERIAL STAGES

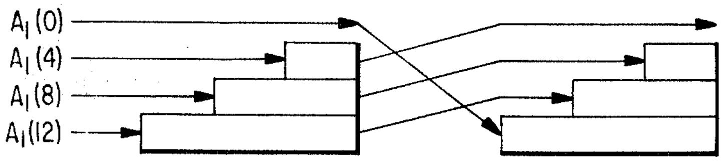
FIG. 4A
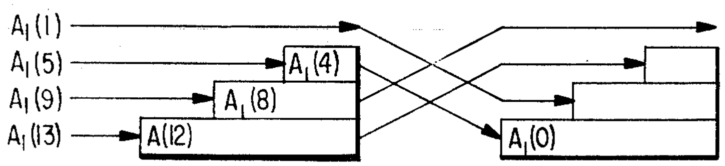
FIG. 4B
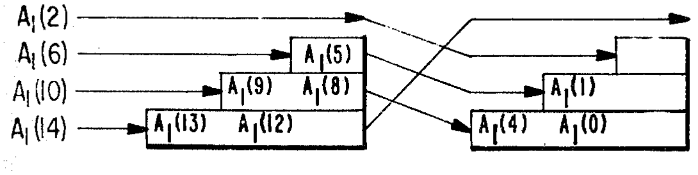
FIG. 4C
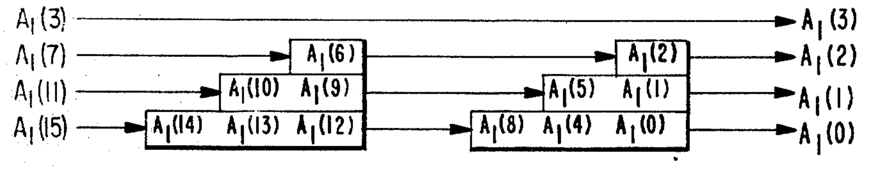
FIG. 4D
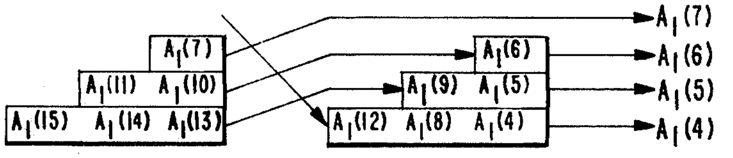
FIG. 4E
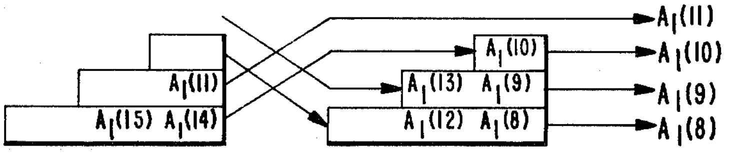
FIG. 4F
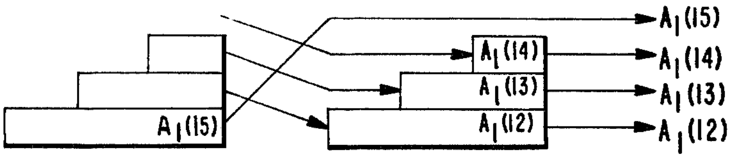
FIG. 4G
FIG. 7
| EXPANSION BASE NUMBER OF "RAILS" | ADDERS | MULTIPLIERS | TOTAL ADDERS | BASE 2 EQUIVALENT ADDERS | MULTIPLIERS | TOTAL ADDERS | SAVING |
|---|---|---|---|---|---|---|---|
| 2 | 4 | 4 | 32 | 4 | 4 | 32 | 0% |
| 4 | 16 | 12 | 100 | 16 | 16 | 128 | 22% |
| 8 | 48 | 32 | 272 | 48 | 48 | 384 | 29% |

HIGH BASE MULTIPLE RAIL FOURIER TRANSFORM SERIAL STAGE

BACKGROUND OF THE INVENTION

The invention relates to a parallel-serial processor or stage for a multiple-input Fast Fourier Transform (FFT) machine which can be used to perform functions such as spectral analysis. The invention particularly concerns a processor stage using a base higher than 2 for the expansion of the algorithm and results in a considerable savings in hardware requirements.

2. Description of the Prior Art

It is known that time and frequency domain analyses are related through Fourier series and transforms, and that given a variable expressed as a function of time, Fourier analysis will break down the variable into a sum of oscillatory functions, each having a specific frequency. This technique has many useful applications as, for example, in spectral analysis. These frequencies, with their corresponding amplitudes and phase angles, will comprise the frequency contents of the original variable. The technique of Fourier transform analysis for digital computers called the Fast Fourier Transform method (FFT) utilizes computers in frequency domain analyses. This method, known as the Cooley-Tukey method (see "An Algorithm For the Machine Calculation of Complex Fourier Series," Math. Computation, Volume 19, pages 297–301, Apr. 1965) reduces the number of multiplications and the resulting hardware required in calculating the frequency contents of a time function by a significant factor compared to the direct method of computation.

The use of parallel-serial stages to expand the Fourier series equations is known in the art. However, known serial stages of a parallel-serial transform machine utilize expansion bases of 2 in order to generate the Cooley-Tukey algorithm. However, a base 2 expansion stage is not efficient compared to higher base expansion stages because of the greater number of arithmetic computations required by a base 2 stage, which correspondingly requires additional hardware.

SUMMARY OF THE DISCLOSURE

This and other disadvantages of the prior art are solved by the instant invention which relates to a processor stage for a multiple-input Fast Fourier Transform (FFT) machine utilizing expansion bases higher than 2 for the Cooley-Tukey algorithm which it implements. The attendant advantage of using higher base recursive equations considerably reduces the hardware required to perform the arithmetic computations.

More specifically, the invention concerns a "multi-rail" serial processor stage for a parallel-serial Fast Fourier Transform (FFT) machine for such exemplary uses as a spectral analyzer or a digital filter-bank. The serial stage according to the invention utilizes a number of "rails" equal to the number of the base used to expand the Fourier series equations, wherein each "rail" is an input and output line to and from the stage. The multiple rails originate at the output of the parallel stage and pass to successive serial stages in the parallel-serial processor in order to derive the desired output therefrom. The processor stage includes appropriate delay means and register sections, and multiplying sections to generate the desired sequences in order to provide the desired expansion of the input to the summing section. The processor stage according to the invention provides a significant decrease in the number of multipliers required compared to the prior art, thereby significantly reducing the complexity, size, and cost of the hardware required.

BRIEF DESCRIPTION OF THE DRAWINGS

FIGS. 4A through 4G are a series of diagrams illustrating register loading procedures;

FIG. 7 is a table showing the relative hardware savings achieved by the invention.

DETAILED DESCRIPTION OF THE INVENTION

Figure 1:
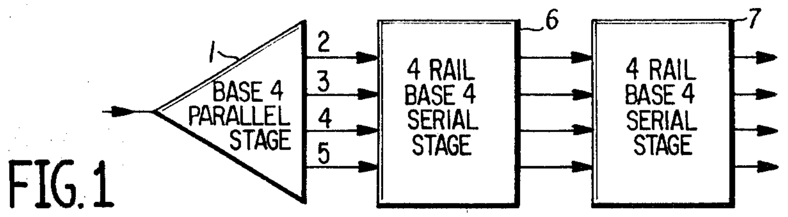
FIG. 1 is a block diagram of a parallel-serial base 4 4 rail processor according to the invention.
Figure 2:
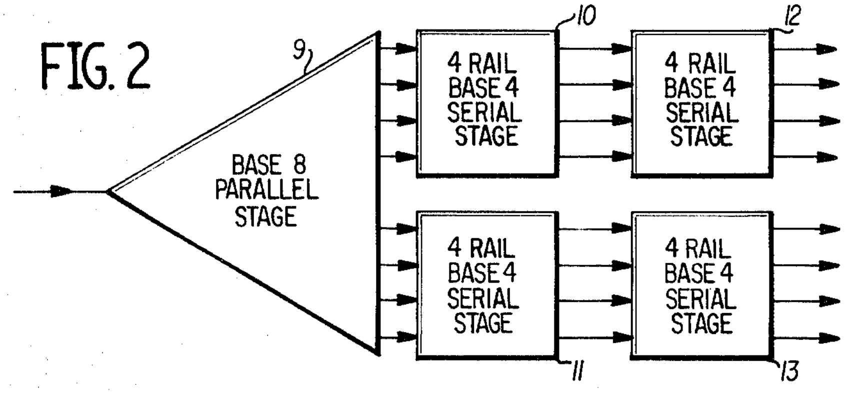
FIG. 2 is a block diagram of a parallel-serial base 8—8 rail processor using dual base 4—4 rail serial processor stages according to the invention.

FIG. 1 illustrates a serial stage processor according to the invention connected to the output of parallel processor stage 1. If a base 4 expansion is desired, the output of base 4 parallel processor stage 1, having four rails 2, 3, 4 and 5, is applied to the input of the 4 rail base 4 serial stage 6. The mechanization of a system according to the invention depends upon the number of rails being equal in number to the base of the Cooley-Tukey expansion that is used. Each serial stage has as outputs the same number of rails as are fed into it. Thus, with respect to FIG. 1, the four rail outputs of serial stage 6 are fed to the input of 4 rail base 4 serial stage 7. Two serial stages connected as shown are required in order to provide the desired expansion as explained hereafter. If it is desired to use base 4 serial stages in an 8 rail parallel-serial machine, two base 4 serial stages can be paralleled as shown in FIG. 2. Thus, FIG. 2 shows base 8 parallel stage 9 having an 8 rail output, four rails of which are applied to the input of 4 rail base 4 serial stage 10, and the other four rails of which are applied to the input of 4 rail base 4 serial stage 11. The four rail outputs of stages 10 and 11 are in turn connected to the four rail inputs of 4 rail base 4 serial stages 12 and 13, the additional serial stages being required in order to provide the desired expansion.

Figure 3:
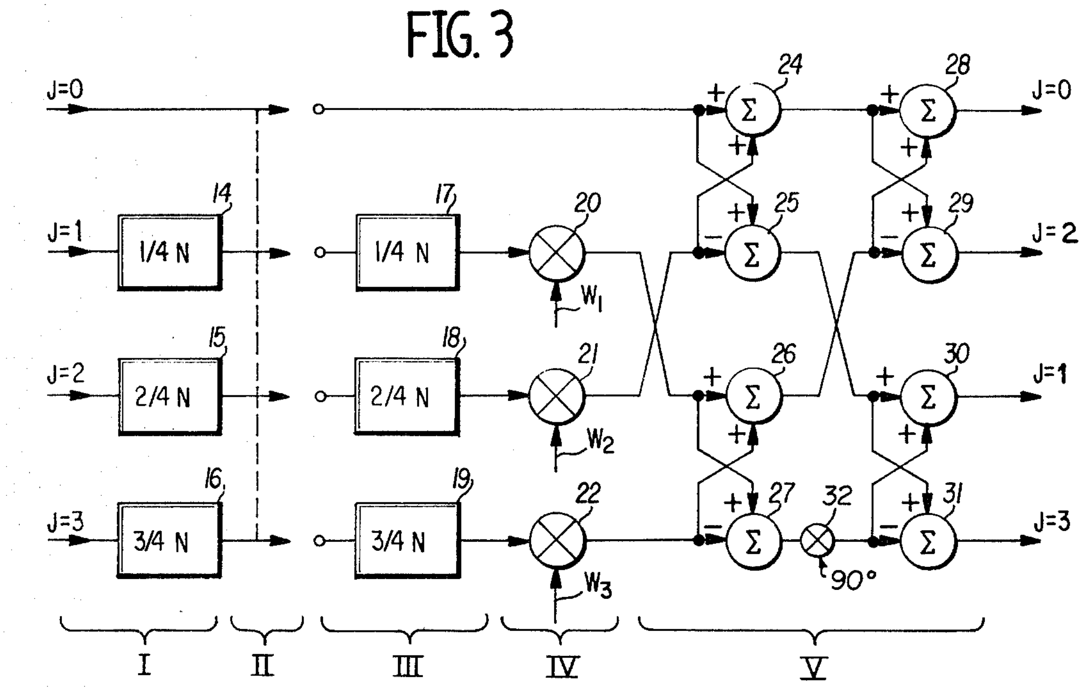
FIG. 3 is an expanded block diagram of a base 4—4 rail serial processor stage, similar to the type that may be used in the processors of FIGS. 1 and 2.

FIG. 3 illustrates in further detail a base 4 serial stage of the type comprising serial stages 6 and 7 of FIG. 1, and 10 through 13 of FIG. 2. Each serial stage may be broken down into five general sections. The first section (I) is a set of delay lines 14, 15 and 16 which align the incoming data in the proper position. The delay lines are selected to enable such alignment and their time delays are related to the number of rails. Thus, with respect to FIG. 3, the top rail has no delay line, and the next rail has a delay line 14 with a delay line equal to ¼N, wherein N is a constant selected to set the delay line to enable the desired alignment of incoming data A(0) through A(15). The remaining two rails have delay lines of 2/4N and ¾N. The second section (II) comprises cyclical switch means (not shown) which are conventional in the art, which switch the outputs from the top rail and the delay lines 14, 15 and 16 of the second, third, and fourth rails, respectively into the top rail and the delay lines 17, 18 and 19, respectively of the second, third, and fourth rails. In the base 4-4 rail serial stage of FIG. 3, the cyclical switch has four operating positions wherein during each position setting, the third section (III) comprising delay lines 17, 18 and 19, is connected to receive a fourth of the data to be handled in the integration period. The delay lines 17, 18 and 19 store the applied data long enough to enable an entire integration period to appear in parallel at the output of the third section. Consider the example of $N = 16$ samples or digital words, i.e., A(0) to A(15), of a given integration period, such as appear serially on input $J=0$ in FIG. 3. The first four samples A(0) to A(3), corresponding to $\frac{1}{4}N$ are supplied to delay 19 in the first switch position, the next four samples A(4) to A(7) to delay 18 in the second switch position, A(8) to A(11) to delay 17 in the third, and A(12) to A(15) (without any delay in the line, and hence directly to multiplier section(III)in the fourth. As shown in detail hereafter, selection of the delays of $\frac{1}{4}N$, $\frac{1}{2}N$, and $\frac{3}{4}N$ results in the samples of the entire integration period (i.e., A(0) to A(15)), appearing in parallel in successive groups of four at the output of section III. (For example, when A(12) appears on the top line from $J=0$, A(8), A(4) and A(0) simultaneously are presented in parallel at the outputs of delays 17, 18 and 19, respectively.

Input samples on each of lines $J=1$, $J=2$, and $J=3$ will be loaded in a similar fashion as the above example. Delays 14, 15 and 16 thus are employed to maintain alignment of the data samples of corresponding integration periods on all four lines $J=0$ to $J=3$, when desired, although those delays of course are optional where alignment is not required.

The fourth section (IV) comprises multipliers 20, 21 and 22, respectively connected to the outputs of delay lines 17, 18 and 19, with the multiplying angles $W_1$, $W_2$ and $W_3$ being selected to provide the proper phase shift for the Cooley-Tukey algorithm.

In general, the angles for the multipliers are:

$$W_m = W^{(j_{p-2} r^{(p-2)} + \ldots + j_0) m r^{n-p}}$$

$m$ = multiplier number
$p$ = stage number $\quad j_i = 0, 1, 2 \ldots r-1$
$n$ = number of stages
$r$ = expansion base of stage
$W = \exp[+(2\pi i/N)]$ The fifth section (V) comprises the summing circuit connected to receive the outputs of the fourth section. In FIG. 3, the summing circuit comprises adder means 24 through 31, and multiplier 32 with a multiplying angle 90°; the summing circuit is arranged to sum the incoming terms with the necessary internal phase shifts in order to generate the outputs required by the Cooley-Tukey algorithm.

The serial stage illustrated and explained with respect to FIG. 3, may be used in a parallel-serial 4 rail processor as shown in the block diagram of FIG. 1. In order to illustrate the generation of the required outputs according to the invention, the system of FIG. 1 will be explained in detail. Serial stage 6 of FIG. 2 comprises a base 4—4 rail serial processor stage as shown in FIG. 3. The operation of the four rails of the input to the circuit of FIG. 3 are independent, and therefore the operation of only one rail will be described herein in order to illustrate the operation of the serial processor stage. Thus it is assumed that the inputs to the top line of FIG. 3 are A(0), A(1) . . . A(15). The delay means 14 through 19 may comprise registers as shown in FIG. 4, having the number of storage positions needed to provide the required delays to effect data alignment. The registers are loaded with data A(0) through A(15) in the following manner in order to effect the desired alignment and outputs therefrom:

$A(k_1, k_0)$ A(0) – A(3) load into bottom register
A(4) – A(7) load into middle register
A(8) – A(11) load into top register
A(12) – A(15) go directly into summing section The multiplier section operates according to the angle equation:

$$W_1 = W_2 = W_3 = W^0 = 1$$

From the foregoing multiplier angle equation, since a zero degree (0°) phase angle results, the multiplier section IV for the first stage does not require any multipliers. Solution of the first recursive equation of the Cooley-Tukey algorithm for a base 4 expansion requires the following results from the summing circuit of the first serial processor stage 6 of FIG. 1 is:

$A_1(j_0, k_0)$ $A_1(0) = A(0)W^0 + A(4)W^0 + A(8)W^0 + A(12)W^0$
$A_1(4) = A(0)W^{12} + A(4)W^8 + A(8)W^4 + A(12)W^0$
$A_1(8) = A(0)W^8 + A(4)W^0 + A(8)W^8 + A(12)W^0$
$A_1(12) = A(0)W^4 + A(4)W^8 + A(8)W^{12} + A(12)W^0$
$A_1(1) = A(1)W^0 + A(5)W^0 + A(9)W^0 + A(13)W^0$
$A_1(5) = A(1)W^{12} + A(5)W^8 + A(9)W^4 + A(13)W^0$
$A_1(9) = A(1)W^8 + A(5)W^0 + A(9)W^8 + A(13)W^0$
$A_1(13) = A(1)W^4 + A(5)W^8 + A(9)W^{12} + A(13)W^0$
$A_1(2) = A(2)W^0 + A(6)W^0 + A(10)W^0 + A(14)W^0$
$A_1(6) = A(2)W^{12} + A(6)W^8 + A(10)W^4 + A(14)W^0$
$A_1(10) = A(2)W^8 + A(6)W^0 + A(10)W^8 + A(14)W^0$
$A_1(14) = A(2)W^4 + A(6)W^8 + A(10)W^{12} + A(14)W^0$
$A_1(3) = A(3)W^0 + A(7)W^0 + A(11)W^0 + A(15)W^0$
$A_1(7) = A(3)W^{12} + A(7)W^8 + A(11)W^4 + A(15)W^0$
$A_1(11) = A(3)W^8 + A(7)W^0 + A(11)W^8 + A(15)W^0$
$A_1(15) = A(3)W^4 + A(7)W^8 + A(11)W^{12} + A(15)W^0$

The base 4 expansion of the 4 rail system in accordance with the foregoing requires phase angle shifts in increments of ¼ of 360°, or 90°. The superscripts 0, 4, 8, and 12 of the W terms correspondingly represent 0°, 90°, 180° and 270° phase angle shifts. Moreover, $W^0$, or 0°, and $W^8$ or 180°, correspond to addition or subtraction, whereas $W^4$, or 90°, and $W^{12}$, or 270°, phase angle shifts are readily implemented in hardware. By recognizing redundancies in the foregoing equations, the 4 rail base 4 serial stage of FIG. 3 is thus accomplished through the use of only three multipliers 20, 21 and 22 and eight adders in the summing section V, the latter including the single, constant phase shift multiplier 32. From the foregoing equations, it is clear from FIG. 3 that the multiplier 32 is positioned to afford the necessary internal phase shifts to the samples processed in the summer section V.

The output from serial stage 6 is applied to the input of serial stage 7 of FIG. 1. The register loading proceeds according to samplings as indicated in FIGS. 4A to 4G.

The angles of the multipliers of the second serial processor stage are chosen according to the following equation:

$$W_m = W(J_0)\ m, \text{ therefore:}$$

$$W_1 = W^{1J_0},\ W_2 = W^{2J_0},\ W_3 = W^{3J_0}$$

The multiplier section thus generates the following sequences in order to provide the desired outputs from the summing section of the second serial processor stage. The results from the summing section are as follows:

$A_2(0) = A_1(0)W^0 + A_1(1)W^0 + A_1(2)W^0 + A_1(3)W^0$ $A_2(1) = A_1(0)W^{12} + A_1(1)W^8 + A_1(2)W^4 + A_1(3)W^0$ $A_2(2) = A_1(0)W^8 + A_1(1)W^0 + A_1(2)W^8 + A_1(3)W^0$ $A_2(3) = A_1(0)W^4 + A_1(1)W^8 + A_1(2)W^{12} + A_1(3)W^0$ $A_2(4) = +A_1(4)W^3 + A_1(5)W^2 + A_1(6)W^1 + A_1(7)W^0$ $A_2(5) = A_1(4)W^{15} + A_1(5)W^{10} + A_1(6)W^5 + A_1(7)W^0$ $A_2(6) = A_1(4)W^{11} + A_1(5)W^2 + A_1(6)W^9 + A_1(7)W^0$ $A_2(7) = A_1(4)W^7 + A_1(5)W^{10} + A_1(6)W^{13} + A_1(7)W^0$ $A_2(8) = A_1(8)W^6 + A_1(9)W^4 + A_1(10)W^2 + A_1(11)W^0$ $A_2(9) = A_1(8)W^2 + A_1(9)W^{12} + A_1(10)W^6 + A_1(11)W^0$ $A_2(10) = A_1(8)W^{14} + A_1(9)W^4 + A_1(10)W^{10} + A_1(11)W^0$ $A_2(11) = A_1(8)W^{10} + A_1(9)W^{12} + A_1(10)W^{14} + A_1(11)W^0$ $A_2(12) = A_1(12)W^9 + A_1(13)W^6 + A_1(14)W^3 + A_1(15)W^0$ $A_2(13) = A_1(12)W^5 + A_1(13)W^{14} + A_1(14)W^7 + A_1(15)W^0$ $A_2(14) = A_1(12)W^1 + A_1(13)W^6 + A_1(14)W^{11} + A_1(15)W^0$ $A_2(15) = A_1(12)W^{13} + A_1(13)W^{14} + A_1(14)W^{15} + A_1(15)W^0$

An analysis of the foregoing outputs from the summing section of the second stage reflect that in addition to the 90° increments of phase shift, $W^0$, $W^4$, $W^8$ and $W^{12}$, (and which are provided by the constant phase shift multiplier of the summing section V), certain variable phase shifts (i.e., which change as a function of the input samples) are required. These phase shifts are achieved by the variable phase shift multipliers 20, 21 and 22 of section IV in FIG. 3.

An analysis of FIG. 3 in light of the foregoing equations demonstrates that the variable phase shift multipliers are so positioned as to produce the requisite total phase shifts through the stage.

By writing the equations for the output of the summing section in terms of the input to the first stage, $A_0$, the output equations become:

$A_2(0) = A_1(0)W^0 + A_1(1)W^0 + A_1(2)W^0 + A_1(3)W^0 =$
$A(0)W^0 + A(4)W^0 + A(8)W^0 + A(12)W^0 + A(1)W^0 + A(5)W^0$
$+ A(9)W^0 + A(13)W^0 + A(2)W^0 + A(6)W^0 + A(10)W^0 + A(14)W^0$
$+ A(3)W^0 + A(7)W^0 + A(11)W^0 + A(15)W^0$ $A_2(1) = A(0)W^{12} + A(4)W^{12} + A(8)W^{12} + A(12)W^{12} + A(1)W^8 + A(5)W^8$
$+ A(9)W^8 + A(13)W^8 + A(2)W^4 + A(6)W^4 + A(10)W^4 + A(14)W^4$
$+ A(3)W^0 + A(7)W^0 + A(11)W^0 + A(15)W^0$ $A_2(4) = A(0)W^{15} + A(4)W^{11} + A(8)W^7 + A(12)W^3 + A(1)W^{14} + A(5)W^{10}$
$+ A(9)W^6 + A(13)W^2 + A(2)W^{13} + A(6)W^9 + A(10)W^5 + A(14)W^1$
$+ A(3)W^{12} + A(7)W^8 + A(11)W^4 + A(15)W^0$

The described combination of the first and second serial stages taken in conjunction with the procedure for register loading, multiplier angles, and summing circuit thus functions to generate the desired sequences in order to provide the expansion according to the Cooley-Tukey algorithm. It particularly will be appreciated from the foregoing that the present invention is a further extension of the symmetry recognized in the Cooley-Tukey algorithm, in that two types of phase shifts — fixed and variable — have been delineated from the expansions (at a base greater than 2) and that the fixed phase shifts have been introduced in summing section V. The symmetry of the summing section V thereby resulting enables use of a common summing section for all four rails. Moreover, by performing the fixed phase shift in the summing section, the burden on the requisite function of the variable phase shift multipliers of section IV is reduced, permitting an overall simplification of the serial stage and particularly permitting reducing the number of multipliers.

Figures 5, 6:
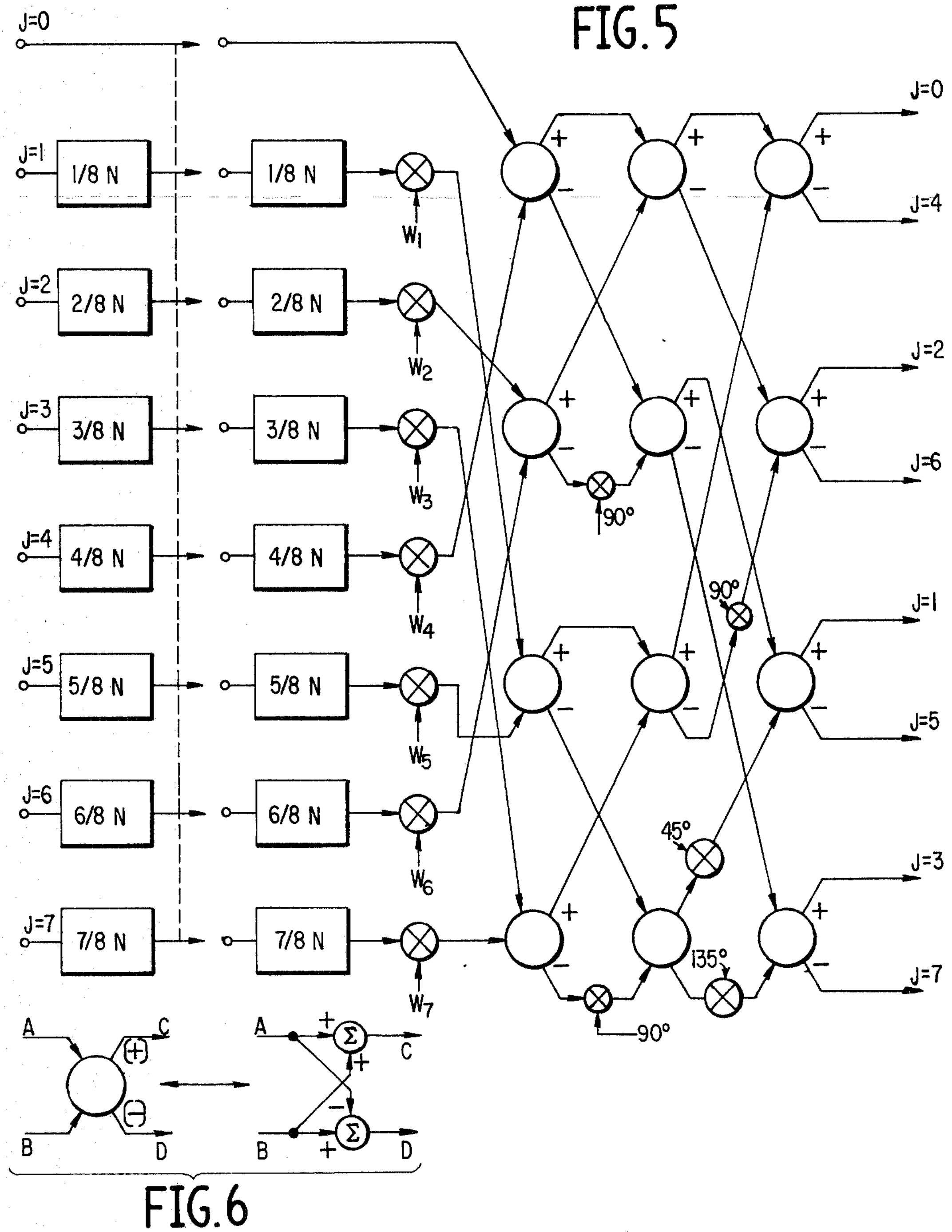
FIG. 5 is a diagram of a base 8—8 rail serial processor stage.
FIG. 6 explains the symbols of the summing circuit section of FIG. 5.

FIG. 5 is a diagram showing a base 8—8 rail serial processor stage according to the invention showing the configuration of the five general sections discussed with respect to FIG. 3. FIG. 6 explains the symbols of FIG. 5 relating to the summing section, which is believed to be self-explanatory.

The complex diagram for a base 8, 8 rail stage is shown in FIG. 5. If the base of Cooley-Tukey expansion is chosen to be a power of 2, the summing section can be greatly reduced by taking advantage of the multiplier of 2. If an expansion base that is not a power of 2 is used, then hard-wired multipliers will have to be used in the summing section. The use of base 8, of course, defines the smallest incremental phase shift to be one-eighth of 360°, or 45°. As in the case of the base 4 expansion, the constant angle phase shifts again are performed in the summing section.

The extension to higher bases than 8 is fairly simple. For bases higher than 4, multipliers must be added to the summing circuitry. The 90° phase shift elements, as noted, need not be multipliers, since this function is readily performed. The additional multipliers required for the base 8 stage (FIG. 5) are not overly complicated (i.e., 45° and 135° in addition to 90°, as to which comment is made above), but base 16 and higher bases require a much larger number of multipliers, minimizing the advantage of going to a stage with a base higher than 8. The invention contemplates the use of one or more serial processor stages and the use of any base number greater than 2, and the specific examples disclosed herein are exemplary systems of the invention.

The advantage of this invention is that it will significantly reduce the hardware required to perform the arithmetic in a serial stage of a parallel-serial processor. The table of FIG. 7 gives a comparison of the hardware required for three different base serial stages. Since a stage with a base higher than two is the equivalent of several base two stages, the equivalent base 2 hardware is tabulated for comparison. If it is assumed that there are seven adders per multiplier, it is seen that a considerable savings is effected.

It appears from the table that the savings achieved from a higher base serial stage is only from a reduction of the multipliers. A further, more subtle hardware savings can be found, however, by using a higher base stage. Since a higher base stage replaces several base 2 stages, many items that are one of a kind in each type stage, such as switches, registers, etc., can be saved by using one higher base stage. For example, in the design of a processor according to the invention, a 27.5 percent total reduction in nonmemory hardware was achieved by replacing the base 2 stages by base 4 stages. Thus the percentage savings is larger than indicated in the table because of the other component savings.

What is claimed is:

1. A processor having parallel and serial processor sections for a Fast Fourier Transform (FFT) machine using expansion bases higher than 2 for the implementation of the Cooley-Tukey algorithm comprising:

first and second sequentially connected serial processor stages for input data, each of the first and second serial processor stages having:

a plurality of input and output means equal in number to the expansion base thereof, alignment means connected to the plurality of input means to align the input data in a predetermined position, means connected to the output of the alignment means to arrange an entire integration period of the data in parallel, multiplier means connected to the last recited means and receiving variable phase shift multiplying angle inputs to provide the proper phase shift for the parallel data in accordance with the algorithm, and a summing circuit connected to receive the output of the multiplier means and including constant phase shift means to generate outputs at the output means in accordance with the algorithm;

the parallel processor section having a number of output means equal to its base expansion number, and wherein the input means of the first serial processor stage is connected to the output means of the parallel processor section, and the input means of the second serial processor stage is connected to the output means of the first serial processor stage to receive as input data the generated outputs therefrom.

2. A processor as recited in claim 1 wherein the alignment means comprise first delay means.

3. A processor as recited in claim 2 wherein the means to arrange the data in parallel comprise second delay means.

4. A processor as recited in claim 3 wherein the first and second delay means comprise interacting register means.

5. A processor as recited in claim 1 wherein the parallel processor section has a base expansion number and number of output means twice that of the base expansion number and number of input means of the sequentially connected first and second serial processor stages, and further comprising:

additional sequentially connected first and second serial processor stages, the input means of the first additional serial processor stage being connected to the remaining output means of the parallel processor stage.

6. A processor as recited in claim 1 wherein the base expansion number and number of output means of the parallel processor section is equal to the base expansion number and number of input and output means of the first and second serial processor stages.

7. A serial processor for a Fast Fourier Transform (FFT) machine using expansion bases higher than 2 for the implementation of the Cooley-Tukey algorithm comprising:

at least one serial processor stage for input data having a plurality of input and output means equal in number to the expansion base of the serial processor, alignment means connected to the plurality of input means to align the input data in a predetermined position, means connected to the output of the alignment means to arrange an entire integration period of the data in parallel, multiplier means connected to the last recited means having variable shift multiplying angles associated therewith to provide the proper phase shift for the parallel data in accordance with the algorithm, a summing circuit connected to receive the output of the multiplier means and including constant phase shift means to generate outputs at the output means in accordance with the algorithm.

8. A serial processor as recited in claim 7 wherein the alignment means comprise first delay means.

9. A serial processor as recited in claim 8 wherein the means to arrange the data in parallel comprise second delay means.

10. A serial processor as recited in claim 9 wherein the first and second delay means comprise interacting register means.

11. A serial processor as recited in claim 7 connected to receive the output of a parallel processor section, the parallel processor section having a number of output means equal to the base expansion number.

12. A serial processor stage for a Fast Fourier Transform machine using an expansion base higher than 2 for the implementation of the Cooley-Tukey algorithm comprising:

input means for converting a succession of input samples of a desired integration period including a predetermined number of samples into a plurality of successive groups of equal numbers of samples, and presenting the corresponding samples of said groups in parallel, a multiplier section for receiving the plural groups of samples from said input means and producing a corresponding number of plural parallel outputs, a summing section receiving the parallel outputs of said multiplier section and producing a corresponding number of plural parallel outputs, said summing section including a plurality of summers and means for multiplying selected ones of said samples by constant phase shifts in accordance with the algorithm, and said multiplier section including multipliers for multiplying selected ones of the samples by variable phase shifts whereby the phase shifts of samples produced through said multiplier and summing sections, and the summing of samples by said summing means, are in accordance with the algorithm.

13. A serial processor stage as recited in claim 12 wherein said input means includes switching means, and storing means having a number of inputs corresponding to the number of groups, said switching means supplies said groups of samples to said inputs of said storing means, in succession, and said storing means includes individual storing means of selected, different storage time periods connected to said inputs for receiving and storing respectively associated ones of said groups of samples for different time periods so as to present the corresponding samples of said groups in parallel to said multiplier section.

14. A serial processor stage as recited in claim 12 wherein:

said multipliers of said multiplier section receive corresponding ones of said groups of samples and variable phase shift inputs $W_m$ in accordance with $$W_m = W^{(j_{p-2} r^{(p-2)} + \ldots + j_0) m r^{n-p}}$$

wherein $m$ = the number of the multiplier

= stage number of the serial stage in a cascaded arrangement of plural serial stages $n$ = the number of cascaded serial stages $r$ = expansion base of stage $W = \exp [ + (2\pi i/N)]$ where $N$ = number of samples in the integration period.

15. A serial processor stage as recited in claim 12 wherein said constant phase shift multiplier of said summing section performs phase shifting in accordance with phase shift angles having a smallest increment of 360° divided by the base of the stage.

16. A serial processor stage as recited in claim 15 and implemented for a base 4 expansion, wherein the constant phase shift multiplier of said summing section performs phase shifting in accordance with phase shift angles having a smallest increment of 90°.

17. A serial processor stage as recited in claim 16 wherein said summing section includes a single 90° phase shifter as the constant phase angle multiplier.

18. A serial processor stage as recited in claim 15 and implemented for a base 8 expansion, wherein the constant phase shift multiplier of said summing section performs phase shifting in accordance with phase shift angles having a smallest increment of 45°.

19. A serial processor stage as recited in claim 18 wherein said summing section includes 45°, 90° and 135° phase shifters as the constant phase angle multipliers.

* * * * *